United States Patent [19]
Badiali et al.

[11] Patent Number: 5,683,046
[45] Date of Patent: Nov. 4, 1997

[54] SYSTEM FOR POSITIONING SPOOLS AT A CONING UNIT OF AN AUTOMATIC CONING MACHINE

[75] Inventors: Roberto Badiali, Pordenone; Luciano Bertoli, Fiume Veneto; Giorgio Colomberotto, Sacile, all of Italy

[73] Assignee: Savio Macchine Tessili S.p.A., Pordenone, Italy

[21] Appl. No.: 583,442

[22] Filed: Jan. 5, 1996

[30] Foreign Application Priority Data

Jan. 10, 1995 [IT] Italy ............................ MI95A0024

[51] Int. Cl.⁶ .......................... B65H 54/02; B65G 25/00
[52] U.S. Cl. ...................... 242/35.5 A; 57/281; 198/745
[58] Field of Search .................. 242/35.5 A, 35.5 R, 242/18 R; 198/739, 745, 732; 57/281

[56] References Cited

U.S. PATENT DOCUMENTS

| | | | |
|---|---|---|---|
| 4,463,909 | 8/1984 | Kiriake | 242/35.5 A |
| 4,781,334 | 11/1988 | Derichs | 242/35.5 A |
| 4,915,212 | 4/1990 | Derichs et al. | 242/35.5 A X |
| 4,940,192 | 7/1990 | Kuepper et al. | 242/35.5 A |
| 4,953,798 | 9/1990 | Tone et al. | 242/35.5 A |
| 5,127,509 | 7/1992 | Kohlen et al. | 242/35.5 A X |
| 5,236,142 | 8/1993 | Teranishi | 242/42 |
| 5,288,030 | 2/1994 | Wirtz et al. | 242/18 R |
| 5,295,570 | 3/1994 | Grecksch et al. | 242/35.5 A X |
| 5,445,334 | 8/1995 | Matsui et al. | 242/18 R X |

Primary Examiner—Michael Mansen
Attorney, Agent, or Firm—George P. Hoare, Jr.; Rogers & Wells

[57] ABSTRACT

A conveyor system for an automatic coning machine having coning units for unwinding thread from spools carried by disks, wherein the system has a conveyor for feeding the spool carrying disks to the machine. A plurality of paths are connected to the feeding conveyor, wherein a path traverses an adjacent coning unit and includes a standby position adjacent the feeding conveyor for receiving spool carrying disks and an unwinding station at the coning unit for receiving spool carrying disks from the standby position. A positioning device has a pair of members positioned along the length and on opposite sides of each of the paths, wherein one of the members has recesses which are spaced apart for receiving a portion of the spool carrying disks at the standby and unwinding positions, and wherein the other of the members has protrusions opposite the recesses for engaging opposing portions of the spool carrying disks and for releasably urging the engaged spool carrying disks into the recesses, to thereby position the spool carrying disks at the standby and unwinding positions. A moving device is connected to the system adjacent each path and operatively connected to each coning unit, and the moving device is adapted to overcome the releasable engagement of the spool carrying disks by the positioning device in response to the exhaustion of the spool carrying disks at the adjacent coning unit and to move the exhausted spool carrying disk from the unwinding position and the spool carrying disk from the standby position to the unwinding position.

12 Claims, 5 Drawing Sheets

SYSTEM FOR POSITIONING SPOOLS AT A CONING UNIT OF AN AUTOMATIC CONING MACHINE

FIELD OF THE INVENTION

This invention relates to an automatic conveyor system for providing spools on carrier disks to an automatic coning machine having one or more coning units, for positioning the spools on the carrier disks at least at a stand-by position and at an unwinding position, and for removing the exhausted spools on the carrier disks from the coning machine.

BACKGROUND TO THE INVENTION

High quality thread can be manufactured by spinning and coning. In the first step, the thread is produced and in the second step the thread is coned or rewound to remove faulty or irregular thread and to thereby provide a high-quality product.

For the coning operation, it is necessary that the spools produced by the spinning step are prearranged with their thread end at a predetermined position, in general with the thread end slid inside the upper bore of the tube on which the thread is wound to form the cop. The automatic coning unit will thus be capable of automatically catching the thread end from the spools as the spools are fed to the coning unit for starting the coning thereof, thus continuing the production of the cones.

Between the spinning frame and the coning machine, rather large amounts of materials have thus to be handled: the empty tubes returned to the spinning frame, on which new cops are rewound, and the filled spools produced by the spinning frame to be prepared and fed to the coning machine. For indicative purposes, in the coning machines designed according to the most recent concepts, each coning station is capable of processing thirty, or even more, spools per hour, so that the total number of spools to be handled can be as large as some thousand pieces per hour. This handling volume requirement is very burdensome and in the most modern facilities it is committed, as far as possible, to automatic devices, with the intervention by the attending operators being reserved for supervision and addressing malfunctions.

A general technical concept for automatic coning machines, which has had considerable success, includes spools positioned and transferred onto spool carrier means provided with a central, vertical pin, and keeping them standing on said carriers also during the preparation and unwinding steps, e.g., according to as taught by Japanese patent JP-A-49-12,128, Kanebo, or German patents 3,213, 253; 3,249,583 and 3,235,442; Murata.

This concept makes it possible to transfer and process spools practically without being touched by any operator, and with only the carriers generally having the nature of spool carrier disk means of circular shape—having to be handled. Furthermore, the spool corner disk means can be identified by instrumental means when a plurality of thread batches are being processed simultaneously from the spool carrier disk means.

According to this approach, the advantages for the processed spools are attained at the cost of some drawbacks, such as the considerable complications of the handling and transport components. A further problem affecting this concept is the positioning of the spool carrier disk means in the coning station, particularly, the unwinding operation of the cop by the coning unit.

2

In fact, one should consider that in the most recent coning machine designs, the coning step is carried out at extremely high unwinding speeds. The upper cone revolves at such high speeds, that it unwinds the thread from the underlying cop at speeds of the order of 25 meters per second, or even higher. The underlying spool is just slid onto the pin of the spool disk carter means which supports it, and rests on a support plane. Owing to the traction applied by the overhanging cone, the thread turns wound on the tube to form the cop, get unwound from it vortically whirling at speeds of the order of 15,000 rpm, forming a ballon around the spool with non-negligible radial stress. The resistance shown by the thread turns to their getting unwound, generated by adhesion forces to adjacent thread turns, and possibly present winding imperfections, generates vibrations tending to shift the spool and the spool carrier disk means from their correct positions. Such phenomena can be even worse if the spool was not correctly positioned since the beginning.

SUMMARY OF THE INVENTION

The present invention relates to a system for positioning the spools on their carrier disks and keeping them properly positioned during the handling steps including moving them between their stand-by, cop unwinding and exhausted spool tube discharging positions at the coning stations.

The present invention provides an improved system for conveying and handling the spools and tubes supported on spool carrier disks free from the drawbacks of the analogous devices and processes known from the prior art.

DESCRIPTION OF THE DRAWINGS

The characteristics and advantages of the present invention will be evident from the disclosure of the illustrative embodiments shown in accompanying Figures, in which:

FIG. 5A-1 is identical to FIG. 4 and FIG. 5A-2 is an exploded view of the hinged portion of the levers; and FIGS. 5B-1 and 5B-2 are similar to FIGS. 5A-1 and 5A-2 and illustrate the movement of the pivoting levers and the cams shown in FIGS. 5A-1 and 5A-2, respectively.

Figure 1:
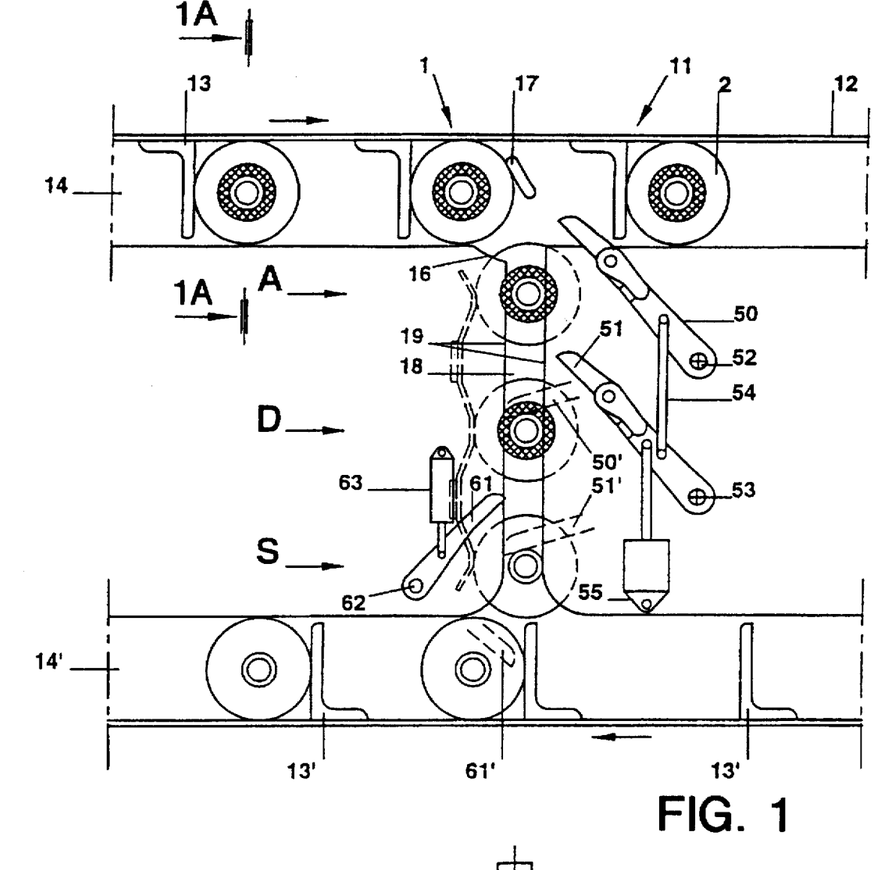
FIG. 1 is a plan view of the system and coning station of an illustrative embodiment of the present invention.
Figure 1A:
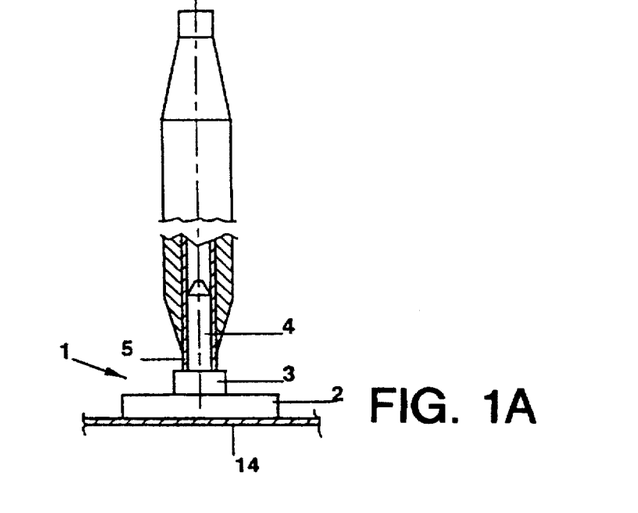
FIG. 1A is a sectional view, taken along the lines 1A—1A thereof, and illustrates a full spool carrying disk on a surface.

The spool carrier disks (1), as evidenced in the detail of FIG. 1A, per se known, is constituted by a circular base (2), and a spool supporting shaft constituted by a collar (3), on which the tube of the spool to be conveyed rests, and a pin (4) which engages the bottom bore of the tube (5) of the spool. The diameter of the collar (3) is consequently substantially larger than of the tube, and the diameter of the pin (4) is slightly smaller than the diameter of the bore of the tube (5), so as to constrain said tube to stand in vertical position on the pin. According to the present invention, the carrier disks are made from materials, and with such a finish degree of their bottom base, as to secure that the base will display low adhesion to the flat surfaces onto which the spool carrier disks (1) comes to rest, so that it can be caused to slide on the surfaces with a very small applied force.

At the beginning of the conveyance operation, the spool to be unwound is positioned on a spool carrier disk by means of per se known devices and methods.

In the scheme illustrated in FIG. 1, facing each coning station installed on the machine front, a conveyor system circulates along a path (11) on which the spool carrier disk means (1) bearing the prepared spools ready to be unwound, are circulated, waiting for being diverted and fed towards the coning stations in such a need, on request by the latter. Such a conveyor system can be constituted by a conveyor belt, or another type of transport means, as, e.g., a thrust type of transport means with brackets (13) borne by a belt (12), which travels from the left to the right, on the plane of the drawing, pushing the spool carrier disk means (1) with their spools to run along the support plane (14).

The full spool feed loop is preferably kept continuously moving and with its transport positions occupied by prepared spools ready to be unwound, so as to meet very rapidly the requests for spools from the coning stations, and constitute a reserve, or magazine, of cops, to meet any request peaks.

At each winding station of the coning machine, the path (11) has, on its inner side towards said station, a branch (16) and a diverting member constituted by a pin or blade (17), which can be commanded to protrude as an obstacle hindering the passage of the spool carrier disk means along the support surface (14), with said diverting member being commanded by means of a drive means of conventional type not indicated in figure, following a request for a spool sent by the overhanging winding or coning unit.

Owing to the combined effect of the push applied by the bracket (13), which continues to move rightwards, and of the hindrance constituted by the blade (17), the spool carrier disk means is pushed to move towards the winding station running along a portion of circular trajectory relatively to the end of the blade (17), until it is disengaged from the push applied by the bracket (13) and reaches the stand-by position (A) along the straight path of the spools inside the interior of the winding station.

When the new spool comes to said stand-by position (A), a sensor means, not indicated in figure, signals the event and commands the diverting blade (17) to be released in order to return to its resting position.

Inside the interior of the coning station, the spool is caused to move along a linear path, not necessarily a straight one, as indicated in the figures.

The spool processing path inside the coning station is realized on a support plane (18), preferably coplanar with the support plane (14) of the loop (11). It is bound by fixed guides (19) and is provided with pushing means to handle the spool disk carrier means.

According to the present invention, the guides (19) are installed in such a way as to lay above the base (2) of the spool carrier disk means and are arranged at a distance from the support plane (18) which is just slightly larger than the thickness of the base (2) of the spool carrier disk means, and at a mutual cross distance which is just slightly larger than the diameter of the collar (3).

The processing path of the coning station contains at least three working positions. A first position, referred to as the "(A) position" is the position reached by the spool as soon as it is delivered by the transport system and waiting for being brought to the unwinding or coning step, which takes place at the second position, i.e., the "(D) position". The unwound spool, which by now does no longer contain its cop, or which cannot be further unwound, is brought to the "(S) position" in order to be discharged to the conveyor system designed to handle the exhausted ("empty") spools.

In the schematic view of FIG. 1, for the sake of simplicity only one of the plurality of spool paths provided in the winding station is shown. Actually, the upper loop feeding the ready spools and the bottom loop for discharging the exhausted spools are connected to each other by a plurality of such paths, the number of which equates to the number of winding or coning units of the machine.

Figure 3:
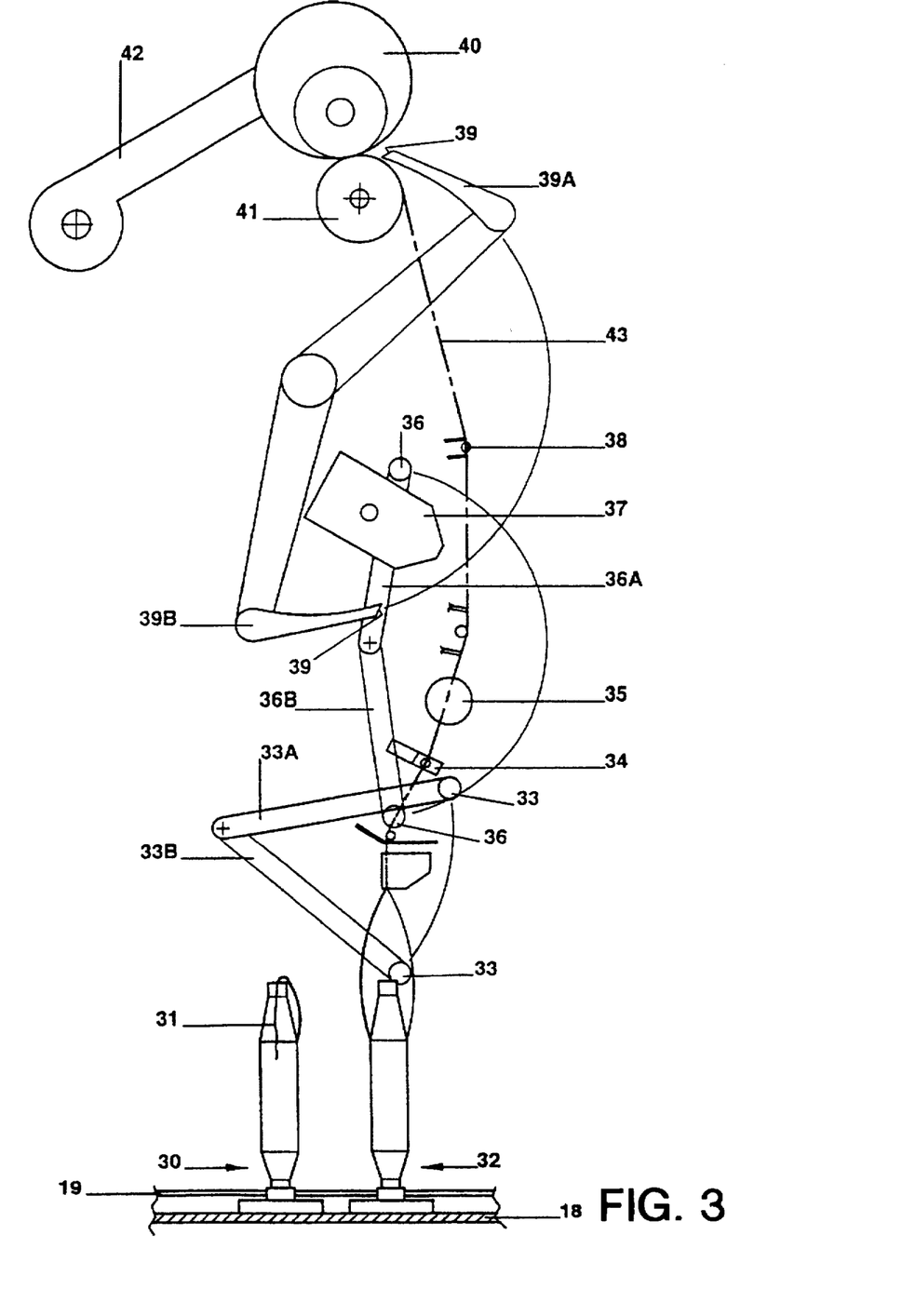
FIG. 3 is a schematic side view of a coning unit which is located adjacent each positioning system of FIG. 2.

In FIG. 3, the coning station is schematically illustrated with its main components.

With the reference numeral (30) a spool in stand-by state is displayed, with its thread end (31) placed inside the top bore of the tube. With (32) the spool which is being unwound is indicated; the reference numeral (33) indicates the suction mouth for spool thread end catching, in its position (33A) in which said suction mouth delivers the thread to the suction mouth of the knotting device, and in its position (33B) in which said suction mouth takes the thread end from the spool (32). The sensor for thread presence on the spool side is indicated with (34) and the thread tightener is indicated with (35). The reference numeral (36) indicates the thread end suction mouth of the knotting device on the spool side, in its position (36A) in which it delivers the thread end to the knotting device (37), and in its position (36B) in which it takes the thread end from the suction mouth (33). The slub catcher is indicated with (38) and (39) is the suction mouth for the thread end from the cone (40), in its positions (39A) in which it catches the thread end from the cone and (39B) in which it delivers said thread end to the knotting device (37). The cone drive roller is indicated with (41) and the cone carrier arm is indicated with (42). The trajectory (43) of the thread between the spool and the cone is indicated in chain line.

The handling of the spools between (A), (D) and (S) positions is determined by commands sent by the coning station. In those cases when the coning procedure was discontinued owing to lack of thread coming from spool side, the spool which is being unwound (32) is regarded as being exhausted by the components of the coning machine, either because it was completely unwound, or because a certain number of attempts of thread end search, catching and knotting were unsuccessful: in that case, the coning machine pilot unit commands the change of the spool which is being unwound.

The command of unwound spool change is then integrated by the pilot unit with both the command for calling a new reserve spool from its stand-by position (A), which is liberated during the spool change, and the command for exhausted spool discharge. The call for the new spool is implemented by causing the diverting blade (17) to move upwards. The exhausted spool which is in (S) position must be removed at once in order to to free the position; said removal must take place on the first signal for discharge.

According to the present invention, the motion of the spools inside the interior of the coning station is caused to take place by a push action.

In the embodiment shown in FIG. 1, the spools are caused to move by means of the pair of pushing levers (50) and (51), which pivot at one end on the horizontal plane around the hinges (52) and which (53), and are linked by the tie-rod (54). They are positioned above the guides (19) and are caused to pivot according to a limited revolutionary stroke in clockwise and counterclockwise directions alternatively, by the double acting hydraulic cylinder (55), e.g., pneumatically actuated with the compressed air from a feeding machine. According to the illustrated embodiment, said levers (50) and (51) are equipped with articulated joints at their free ends which remain stiff when said levers urge downwards on the collars (3), i.e., towards the discharge path by being caused to revolve counterclockwise; and which, on the contrary, fold on themselves when, during their return movement back to their rest positions, said levers are caused to revolve clockwise and engage the collar of the spool carrier disk carrying the new spool which is being unwound and, possibly, also constituted by the collar of the new spool in stand-by position. Said articulated joints return back to their extended position after overcoming the collars, owing to the action of a spring of conventional type, not indicated in figure.

During their revolutionary movement in counterclockwise direction, the levers (50) and (51) reach their positions (50') and (51') catching both spools illustrated in the figure in positions (A) and (D), respectively, and moving them to the positions (D) and (S), respectively. In the same way as for the spool in (A) position, when the new spool comes to the (D) position a sensor, not indicated in figure, signals the occurred change to the pilot unit which then may command the coning procedure to start again.

The spool discharged to the (S) position is immediately removed.

Also the conveyor system for the exhausted spools, like the conveyor system for the full spools, can be constituted by a conveyor belt or another type of transport system, e.g., a push transport system with brackets and a support plane.

The step of delivering the exhausted spool to the transport system for the exhausted spools is commanded by the coning machine pilot unit. The removal takes place by means of a push lever system analogous to the preceding one and constituted by a push lever (61) which pivots around the hinge (62). Said push lever is caused to revolve according to a limited revolution stroke in clockwise and counterclockwise directions, by the double acting cylinder (63). As soon as the spool carrier disk means with the exhausted spool is urged to reach its useful position in which it can be caught by the arriving bracket (13'), the lever (61) is caused to return back to its rest position.

Figure 2:
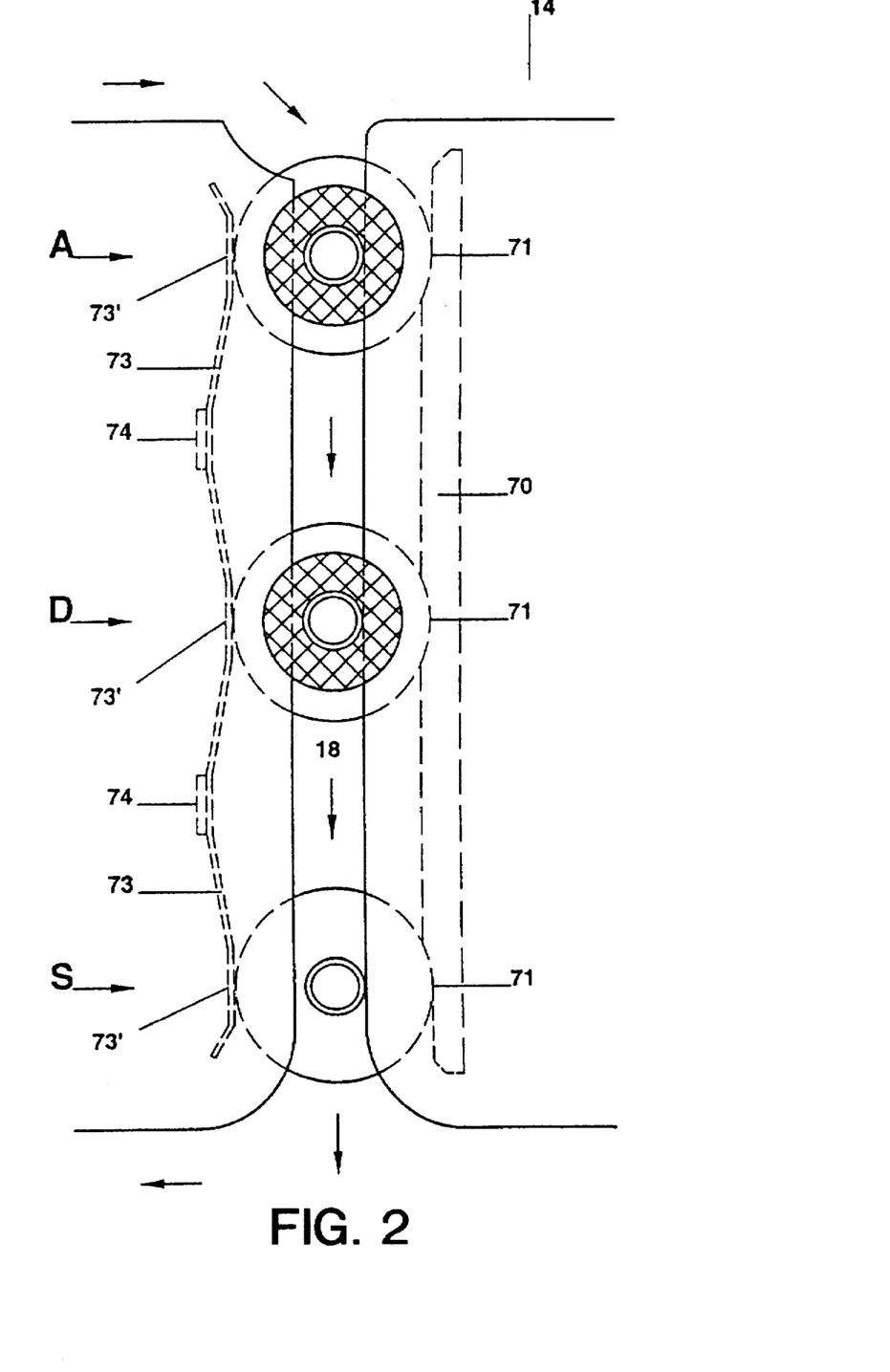
FIG. 2 is a partial enlarged plan view of FIG. 1 of an illustrative embodiment of the positioning system of the present invention.

As already described, FIG. 2 illustrates, by referring to a typical embodiment, the positioning system which secures the correct positioning of the spool carrier disk means. Said positioning system is one from the feature of the present invention.

Under the guides 19, which engage the collar of the spool carrier disk means, and above the support plane (18), a guide or positioning system for the base (2) of the spool carrier disk means is provided.

According to the illustrative embodiment shown in FIG. 2, the guide system is constituted by a fixed body (70) positioned on the right-hand side to the guides (19), and provided with hollows (71) corresponding to the above cited processing positions, in which the spool carrier disk means with its overhanging spool must be accurately positioned. As illustrated, all three positions of the system are shown: the three stand-by, unwinding and discharge positions, whilst, strictly speaking, only the first two positions require accurate positioning; an accurate positioning at the discharge position, is optional. Such positions correspond to the stroke limits provided for controlling the strokes of the levers (50) and (51) installed above the overhanging guides (19), not indicated FIG. 2 for the sake of simplicity.

The shape of the hollow (71) is consistent with the curvature of the cylindrical base of the spool carrier disk means, so as to fit to it. On the opposite side of the guides (19) a semi-elliptic spring (73) is installed, with convexities (73') protruding towards the hollows (71) and opposite to them. Such semi-elliptic springs (73) are fastened and adjusted relatively to the plane (18) by means of brackets (74), in such a way that said convexities (73') are facing said hollows (71).

As to the operation of the positioning component organ, it will be easily seen that the spool carrier disk means is moved along the path bound by the guides (19) and owing to the effect of the stroke of levers (50)/(51) in vertical direction on the plane of the drawing of FIG. 2, sliding along the straight portion of the face of the body (70). When the cylindrical peripheral portion of the spool disk means finds the convexity (73') of the semi-elliptic spring (73), the stroke of the pushing levers (50)/(51) towards their stroke limit continues according to a slightly, but meaningfully diverted path, owing to the thrust applied by the semi-elliptic spring, towards the interior of the hollow (71), crosswise relative to said path. In general, the depth of the hollow (71) does not exceed the width of the space between the guides (19), which exceeds the diameter of the collar (3) of the spool carrier disk means, i.e., is shorter than the difference between said dimensions.

Figure 4:
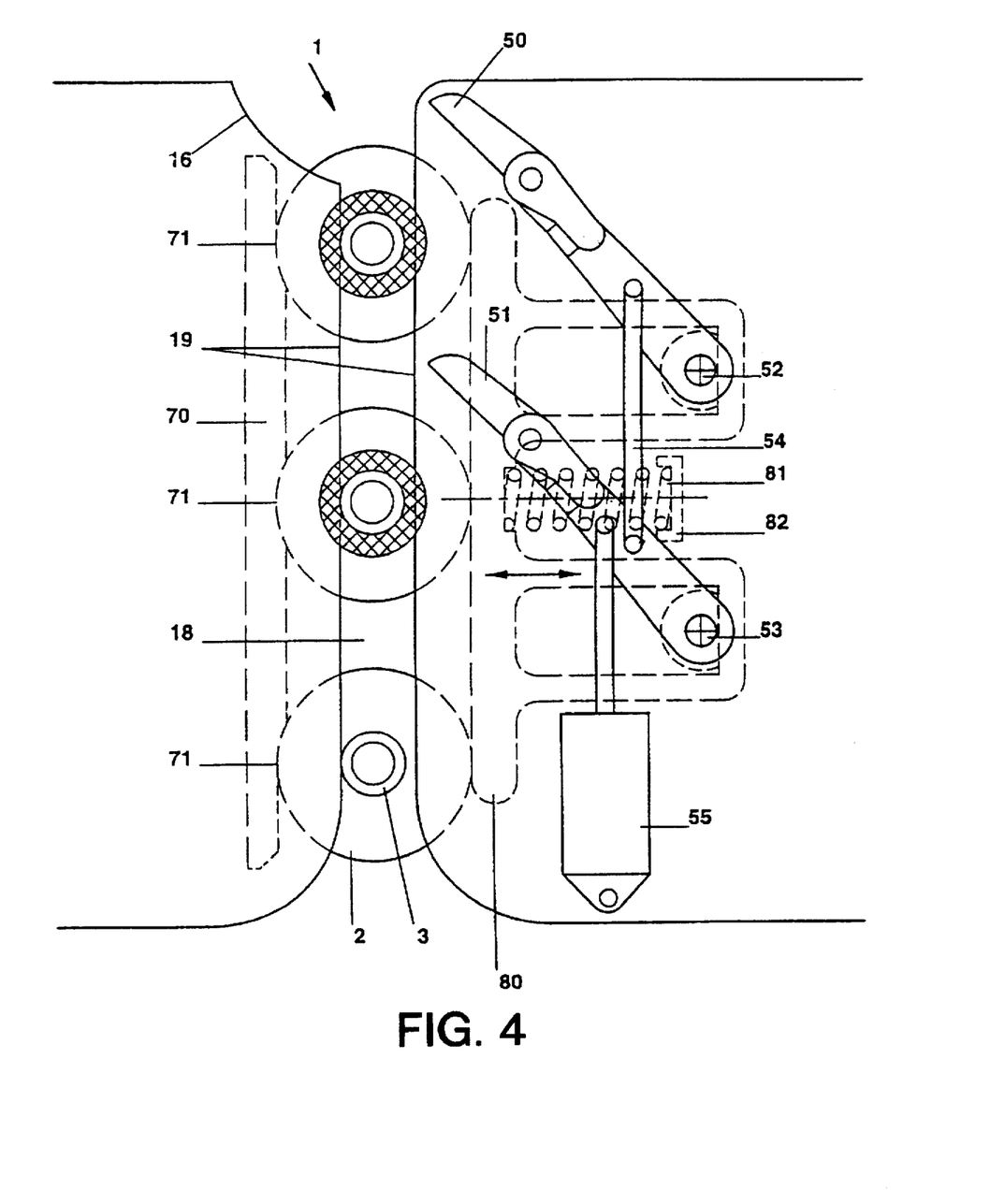
FIG. 4 is a plan view of another embodiment of the positioning system of the present invention.

In FIG. 4 another embodiment is shown of the positioning system which secures the correct position of the spool carrier disk means.

According to this embodiment, the fixed body (70) with its hollows (71) is provided to the left of the path of the guides (19), and the transversal pushing member is installed to the right. According to this embodiment, the pushing member for said spool carrier disk means inside said positioning hollows (71) is constituted by a slider (80) provided with guide means (not shown in the figure) which allow it to reciprocate transversally to the path defined by the guides (19). Such a slider (80) is urged leftwards by a spring (81) compression loaded against a fixed stop member (82), thus tending to urge the spool carrier disk means against the hollows (71). At its opposite sides, the slider (80) is provided with actuation hollows (83), (84).

Under the guides (19), on both hinges (52)/(53) for the levers (50)/(51), and integral with them, two cams (85)/(86) are installed with their contour being kept engaged with the actuation hollows (83)/(84) by the thrust applied by the spring (81)—but, possibly, in the position of farthest shift of the slider (80) to the left.

In FIGS. 5A-1, 5A-2, 5B-1 and 5B-2, both end positions of the operation of the slider (80) are shown.

Figure 5A:
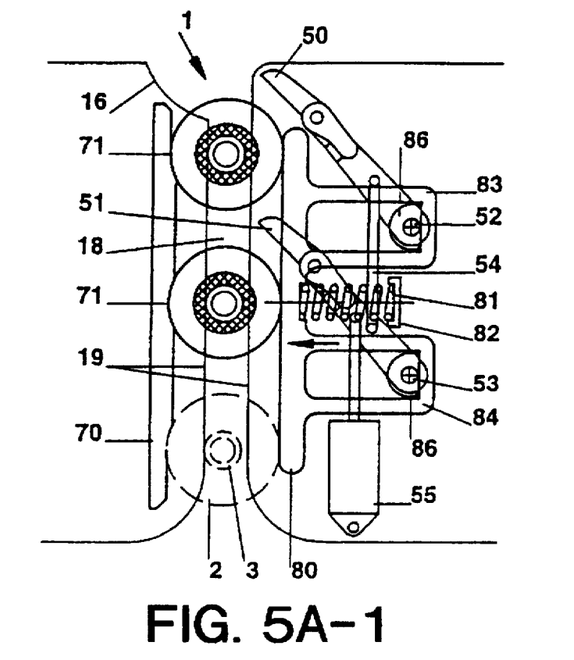
Figure 5A:
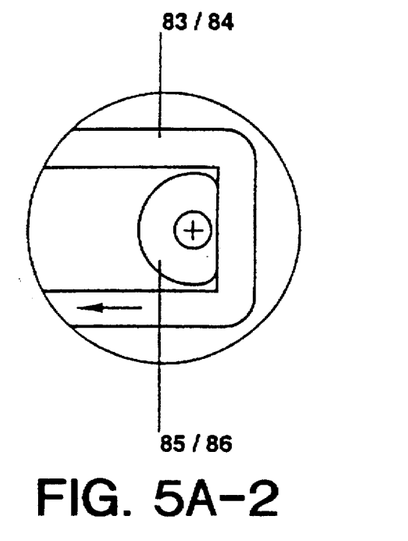

In FIG. 5A-1 and 5A-2, the levers (50)/(51) are in their normal rest position, and the (A) position is occupied by a spool in the stand-by position, ready to be processed; the (D) position is occupied by a spool which is being unwound, and the (S) position is free, waiting for receiving the spool disk carrier means bearing the empty tube. The levers (50)/(51) engage the hollows (83)/(84) with the low contour of the cams (85)/(86); therefore, said hollows (83)/(84) allow for spring (81) to shift the slider (80) to the left—thus taking its most outwards protruding configuration.

Said slider pushes the spool carrier disk means to the left, and causes them to be engaged inside their respective hollow (71). Such an action of blockage of the spool carrier disk means with its spool counteracts and resists the stresses which may be caused by the unwinding operation.

Figure 5B:
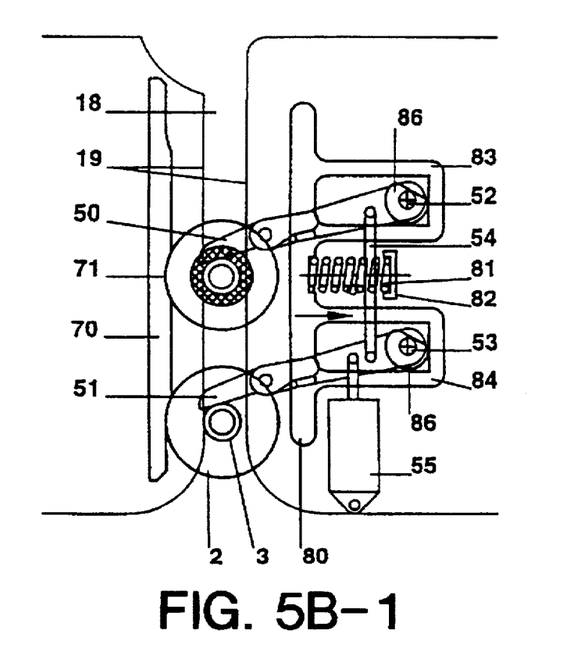
Figure 5B:
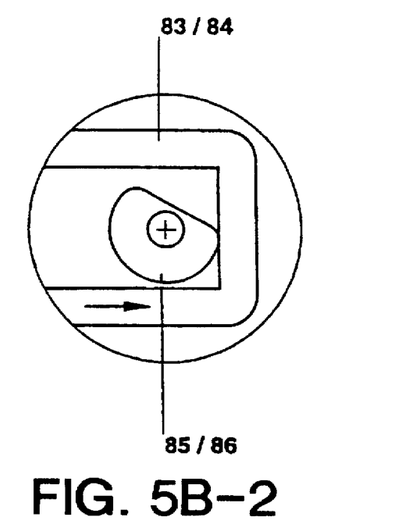

When the spool in the (D) position is exhausted, the spool change is carried out by actuating the levers (50)/(51) with the pneumatic cylinder (55); the levers (50)/(51) rotate counterclockwise to push the spool carrier disk means downwards, as seen in FIG. 5B-1 and 5B-2.

Upon rotating, the levers (50)/(51) cause the high portion of the contour of the cams (85)/(86) to come into engagement with the hollows (83)/(84) as seen in FIGS. 5B-1 and 5B-2; thus, they compress the spring (81) causing it to turn into its most compressed configuration, and thereby cause the slider (80) to move to the right. The slider (80) liberates the spool disk carrier means, which can thus smoothly disengage from their respective hollow (71) under the thrust applied by the levers (50)/(51).

When the spool change is over, the levers return upwards to their initial positions, by rotating clockwise and causing the spool carrier disk means to be blocked again.

According to a further embodiment, the hollows (71) corresponding to the stand-by and discharge positions can be countersunk in the incoming and departure directions, respectively, so as to disengage in time the operations of feeding the new spool to the stand-by position of the coning station and of removal of the exhausted spool from the discharge position, from the action of spool carrier disk means blockage by the cams (85)/(86).

The system according to the present invention for handling and positioning the spools along their processing path in the coning station offers considerable advantages over the systems known from the prior art. Among them, we regard the following as being worth mentioning.

The full spool feed loop can be kept continuously moving and with all, or most, of its transport positions being full with ready-to-unwind spools, so as to meet very rapidly the requests for spools coming from the coning stations, and to constitute a reserve (magazine) of ready-to-unwind spools for meeting request peaks.

The presence of the the upper guides (19) will secure that the spool carrier disk means will always remain resting on the support plane (18) and that the spool will always stand in vertical position, owing to the action of blocking the spool carrier disk means inside the hollows (71) of the fixed body (70) under the thrust applied by elastic means of semi-elliptic spring type (73), or by the slider (80). The support surface (18) can be provided with suitable openings for removing dirt and impurities developed during the unwinding step. The positioning system with elastic blockage allows the spool carrier disk means to counteract and withstand the stresses which may be applied by the unwinding operation of both hairy threads or irregularly wound threads.

What is claimed:

1. In a conveyor system for an automatic coning machine having coning stations for unwinding thread from spools carried by disks, wherein the system has a conveyor for feeding the spool carrying disks to the machine, the improvement comprising:

a plurality of paths connected to the feeding conveyor, wherein one of said paths traverses an adjacent coning unit and wherein said path includes a standby position adjacent the feeding conveyor for receiving spool carrying disks and an unwinding station at the coning unit for receiving spool carrying disks from the standby position, a positioning device including a pair of members positioned along the length and on opposite sides of each of said paths, wherein one of said members has recesses therein which are spaced apart and which are adapted to receive a portion of the spool carrying disks at the standby and unwinding position, and wherein the other of said members has protrusions opposite said recesses for engaging opposing portions of the spool carrying disks and for releasably urging the engaged spool carrying disks into said recesses, to thereby position the spool carrying disks at the standby and unwinding positions, and a moving device connected to the system adjacent each path and operatively connected to each coning unit adjacent thereto, wherein said device is adapted to overcome the releasable engagement of the spool carrying disks by said positioning device in response to the exhaustion of the spool carrying disks at the adjacent coning unit and to move the exhausted spool carrying disk from the unwinding position and the spool carrying disk from the standby position to the unwinding position.

2. The conveyor system of claim 1, wherein each of the disks of the spool carrying disks has a base and a collar thereabove which has a breadth that is less than the breadth of said base.

3. The conveyor system of claim 2, wherein said members of said positioning device releasable engage said bases of the spool carrying disks.

4. The conveyor system of claim 3, wherein said protrusions of said other member are formed by a spring.

5. The conveyor system of claim 4, wherein said other member with its protrusions is a reciprocable slide.

6. The conveyor system of claim 5, wherein a spring mechanism contacts and constantly urges said slide toward said recesses of said one member.

7. The conveyor system of claim 1, wherein said moving device comprises a pair of spaced apart pivotal levers at each of said paths and the adjacent coning unit, wherein said levers have rest positions out of each said path and which are movable into said path for engaging the spool carrying disks in the standby and unwinding positions, respectively, in response to the exhaustion of the spool carrying disk at the unwinding position and for concurrently moving the exhausted spool carrying disk from the unwinding position and the spool carrying disk from the standby position to the unwinding position.

8. The conveyor system of claim 7, wherein said levers are hingedly connected to the system at one of their ends adjacent each said path and include articulated free ends, wherein said levers are movable in one direction from a rest position into said adjacent path for engaging and moving the spool carrying disks while said levers remain rigid, and wherein said articulated free ends of said levers are foldable upon themselves upon engagement with the spool carrying disks in said path as said levers move in the opposite direction and return to their rest positions.

9. The conveyor system of claim 8, wherein said other member with its protrusions is a reciprocable slide having a spring mechanism which contacts and constantly urges said slide toward said recesses of said one member, and wherein cams operatively connected to said pivoting levers and in contact with said slide move with said levers to, in turn, move said slide away from said one member as said levers pivot into said path and into contact with the spool carrying disks therein.

10. The conveyor system of claim 1, wherein the system also has a removal conveyor for transporting exhausted spool carrying disks from the coning machine, and wherein each of said traversing paths interconnects the feeding and removal conveyors at each coning unit, and wherein each of said paths includes a discharge position adjacent the removal conveyor for receiving the exhausted spool carrying disk from the unwinding position.

11. The conveyor system of claim 10, further comprising a device adjacent said discharge position of each of said paths for engaging the exhausted spool carrying disk thereat and for moving the exhausted spool carrying disk onto the removal conveyor.

12. The conveyor system of claim 1, further comprising a movable deflector operatively connected to each coning unit and its adjacent path, wherein said deflector is movable into the path of a spool carrying disk on the feed conveyor for engaging and deflecting the movement of the spool carrying disk from the feed conveyor and into the standby position of said adjacent path when a spool carrying disk is required by the coning unit in its adjacent path.

* * * * *